(12) United States Patent
Kwak et al.

(10) Patent No.: US 8,555,280 B2
(45) Date of Patent: Oct. 8, 2013

(54) TERMINAL DEVICE OF NON-ANDROID PLATFORM FOR EXECUTING ANDROID APPLICATIONS, AND COMPUTER READABLE RECORDING MEDIUM FOR STORING PROGRAM OF EXECUTING ANDROID APPLICATIONS ON NON-ANDROID PLATFORM

(75) Inventors: Min-chul Kwak, Seoul (KR); Hyeok-Gon Ryu, Gyeonggi-do (KR); Dong-Young Lim, Gyeonggi-do (KR); Kwang-Chul Shin, Gyeonggi-do (KR)

(73) Assignee: Infraware Technology, Inc., Seoul (KR)

( * ) Notice: Subject to any disclaimer, the term of this patent is extended or adjusted under 35 U.S.C. 154(b) by 132 days.

(21) Appl. No.: 13/262,332

(22) PCT Filed: Dec. 11, 2009

(86) PCT No.: PCT/KR2009/007439
§ 371 (c)(1),
(2), (4) Date: Sep. 30, 2011

(87) PCT Pub. No.: WO2011/071202
PCT Pub. Date: Jun. 16, 2011

(65) Prior Publication Data
US 2012/0023496 A1    Jan. 26, 2012

(30) Foreign Application Priority Data
Dec. 8, 2009  (KR) .................. 10-2009-0121002

(51) Int. Cl.
*G06F 9/455*     (2006.01)
*H04M 11/00*   (2006.01)

(52) U.S. Cl.
USPC ............................................. 718/1; 455/403

(58) Field of Classification Search
None
See application file for complete search history.

(56) References Cited

U.S. PATENT DOCUMENTS

| | | | |
|---|---|---|---|
| 2003/0181193 A1* | 9/2003 | Wilhelmsson et al. | 455/403 |
| 2007/0050820 A1 | 3/2007 | Saarikivi et al. | |
| 2007/0240171 A1* | 10/2007 | Biro et al. | 719/328 |
| 2009/0172657 A1* | 7/2009 | Makelainen et al. | 717/174 |

FOREIGN PATENT DOCUMENTS

KR  10-0842084  6/2008

OTHER PUBLICATIONS

International Search Report for corresponding International Patent Application No. PCT/KR2009/007439, dated Dec. 15, 2010.

\* cited by examiner

*Primary Examiner* — Meng An
*Assistant Examiner* — James J Lee
(74) *Attorney, Agent, or Firm* — Greenblum & Bernstein, P.L.C.

(57) ABSTRACT

Provided is a terminal device having a VM-based layer structure for executing heterogeneous applications. The terminal device includes: an application layer module including a first application and a second application; a platform layer module connected to a terminal processor and configured to operate the first application; and a middleware module configured to connect the platform layer module and the second application.

8 Claims, 4 Drawing Sheets

TERMINAL DEVICE OF NON-ANDROID PLATFORM FOR EXECUTING ANDROID APPLICATIONS, AND COMPUTER READABLE RECORDING MEDIUM FOR STORING PROGRAM OF EXECUTING ANDROID APPLICATIONS ON NON-ANDROID PLATFORM

CROSS-REFERENCE(S) TO RELATED APPLICATIONS

The present application claims priority of Korean Patent Application No. 10-2009-0121002, filed on Dec. 8, 2009, which is incorporated herein by reference in its entirety.

BACKGROUND OF THE INVENTION

1. Field of the Invention

Exemplary embodiments of the present invention relate to a terminal device having a VM (virtual machine)-based layer structure for executing heterogeneous applications, and more particularly, to a terminal technology which optimizes the android framework for low-end devices such that Google android applications may be executed in terminals which do not operate on the android platform but operate on other platforms, and includes a porting layer configured to connect a terminal platform to middleware and a VM provided by reconfiguring the Dalvik VM to be executed on a single task.

2. Description of Related Art

The Google android platform is a software stack released by OHA (Open Handset Alliance) led by Google, and indicates a software package including the Linux kernel, a VM, a framework, and applications.

The Google android platform may be applied only to high-end smartphones which include a large-sized display screen with 800×480 WVGA (wide VGA) resolution and provide a touch screen input.

In order to execute a Google android application, the entire android software stack should be applied to a terminal device. Since the android software stack includes the Linux kernel and a plurality of basic services such as a system daemon, the Google android platform is suitable for high-end smartphones.

Accordingly, the android applications have a limitation in that they should be executed only in high-end smartphones. Therefore, the android applications cannot be executed in general feature phones which operate on other platforms.

SUMMARY OF THE INVENTION

An embodiment of the present invention is directed to a terminal technology having a VM-based layer structure for executing heterogeneous applications, which is not only capable of executing Google applications even in low-end terminal devices, but also capable of native applications supported by the platforms of general terminal devices.

Another embodiment of the present invention is directed to a terminal device having a VM-based layer structure for executing heterogeneous applications. The terminal device includes: an application layer module including a first application and a second application; a platform layer module connected to a terminal processor and configured to operate the first application; and a middleware module configured to connect the platform layer module and the second application. The middleware module includes: a class library layer module including an application framework module having a class library required for executing the second application and a core class library module providing a Java API (Application Programming Interface); a native library layer module including a VM configured to operate the second application through the class library and the Java API and a native library used for implementing the library of the application framework module; and a porting layer module configured to connect the native library layer module and the platform layer module and provide a function of managing hardware of a terminal through the platform layer module.

The first application may include a native application, the second application may include an android application, and the VM may include a Dalvik VM.

The VM may operate on a single task in interconnection with the platform layer module through the porting layer module.

The VM may include one or more of a thread management module, a dynamic library management module, a foreign function interface (FFI), a synchronization module, and a memory management module, and may operate in interconnection with the platform layer module through the porting layer module.

The porting layer module may include one or more of a file system, a memory allocation module, a network module, a basic library, a timer, and a device control module, and may be configured to access corresponding hardware of the terminal device and manage and control the hardware.

The native library layer module may include one or more native libraries which operate in interconnection with the hardware management modules of the porting layer module.

The application framework module may include one or more service modules for performing telephone service, location-based service, Bluetooth networking service, WiFi networking service, USB service, and sensor service, and executes a corresponding service in background according to the execution of the second application.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
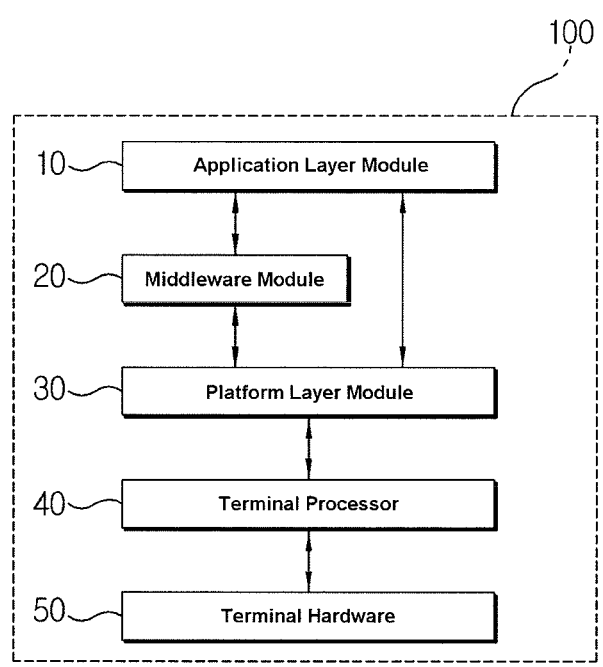
FIG. 1 is a block diagram schematically illustrating the entire configuration of a terminal device having a VM-based layer structure for executing heterogeneous applications according to an embodiment of the present invention.

FIG. 1 is a block diagram schematically illustrating the entire configuration of a terminal device 100 having a VM-based layer structure for executing heterogeneous applications according to an embodiment of the present invention.

The terminal device 100 includes an application layer module 10, a middleware module 20, a platform layer module 30, a terminal processor 40, and terminal hardware 50.

In general, the terminal device 100 refers to a mobile device such as a mobile phone or MP3 player. However, the terminal device 100 may include general terminal devices which are operated by the terminal processor 40, based on platforms.

First, the application layer module 10 includes a first application and a second application. Here, the first application indicates a native application which may be directly executed on the platform of the terminal device, and the second application indicates an added application which may be executed through middleware including a porting layer and a VM.

In the case of a mobile terminal on the WISE (Web-based Inquiry Science Environment) platform of LG, native applications operating on the WISE platform corresponds to the first application, and the Google android applications correspond to the second application.

The platform layer module 30 is connected to the terminal processor 40 and configured to operate the first application.

The middleware module 20 is positioned between the platform layer module 30 and the application layer module 10 and configured to connect the second application provided in the application layer module 10.

At this time, the middleware module 20 not only includes a VM and a library to execute the second application, but also includes a porting layer to connect the middleware module 20 to the platform layer module 30. The details of the middleware module 20 will be described with reference to FIGS. 2 to 4.

The terminal processor 40 is a central processing unit (CPU). In the case of a mobile terminal, a mobile-dedicated processor capable of processing a variety of multimedia and a communication function may be used as the terminal processor 40.

The terminal hardware 50 includes a screen output unit, an audio output unit, and a user input unit which compose the terminal device.

Figure 2:
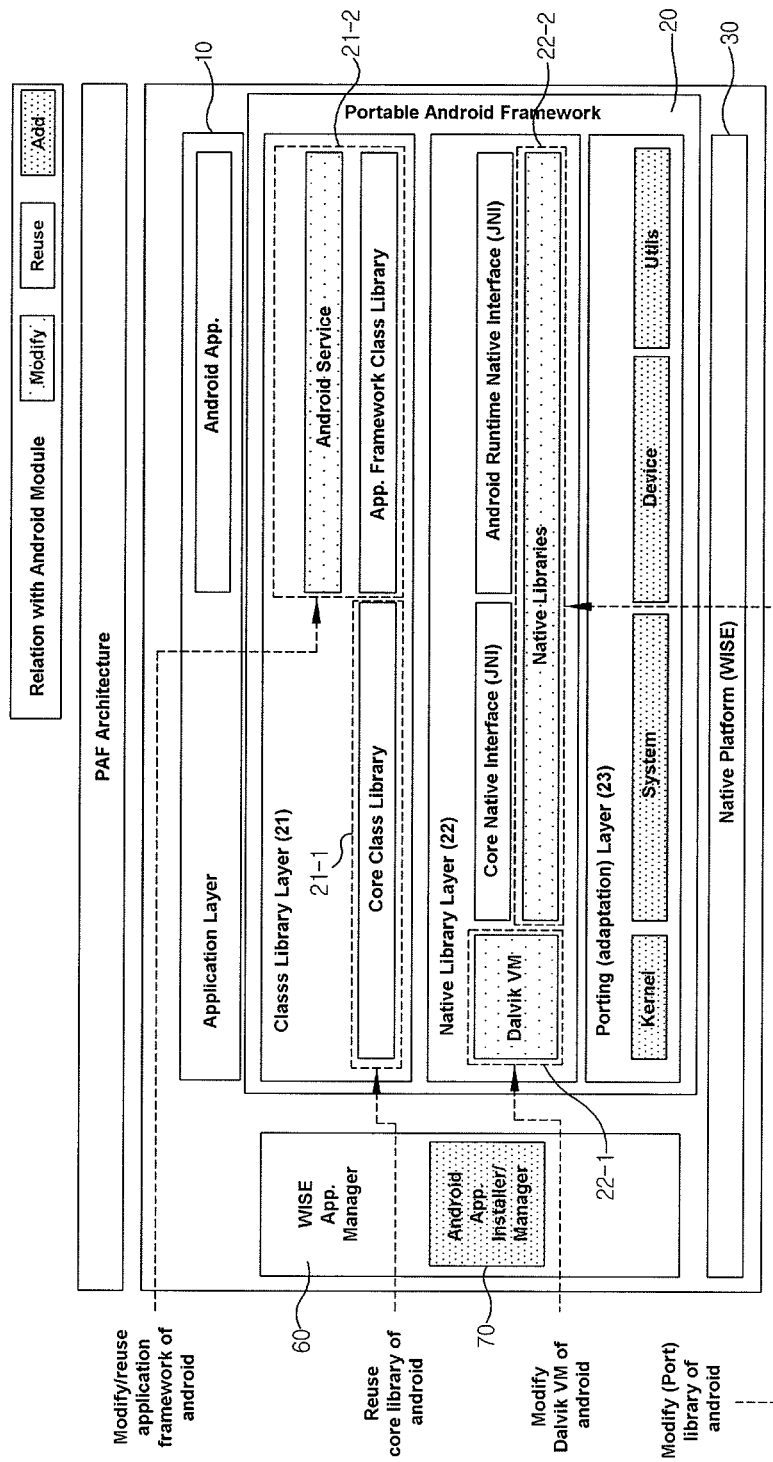
FIG. 2 is a block diagram illustrating the detailed configuration of a middleware module of FIG. 1.

FIG. 2 is a block diagram illustrating the detailed configuration of the middleware module 20 of FIG. 1.

The middleware module 20 may be divided into a class library layer 21, a native library layer 22, and a porting layer 23. At this time, the respective layers become close to the physical layer in the downward direction. The lowermost porting layer 23 is positioned adjacent to the platform layer module 30, and the uppermost class library layer 21 is positioned adjacent to the application layer module 10.

The class library layer module 21 includes an application framework module 21-2 including a class library required for executing the second application and a core class library module 21-1 providing the Java API (Application Programming Interface).

In an actual example, the application framework module 21-2 is used by modifying or reusing an application framework module of the Google android platform. The application framework module of the Google android platform includes a class library and services required for executing android applications. At this time, some services are not needed for compatibility with the applications, and thus may be removed to reduce the weight.

Furthermore, the core class library module 21-1 is applied by reusing a core library which belongs to the android runtime in the Google android platform. The core library of the Google android platform includes a basic Java API for programming in Java.

The native library layer module 22 includes a VM 22-1 configured to operate the second application positioned in the application layer 10 through the class library provided in the application framework module 21-2 and the Java API provided in the core class library module 21-1. Furthermore, the native library layer module 22 includes native libraries 22-2 which are to be the foundation for implementing libraries of the application framework module 21-2.

In an actual example, the VM 22-1 is applied by modifying the Dalvik VM of the Google android platform. That is, Linux-dependent modules are removed from the existing Dalvik VM, functions which are not provided by other platforms are added, and the Dalvik-VM is reconfigured in a structure to be executed even on a single task.

Furthermore, the native libraries 22-2 are applied by reusing libraries positioned under the application framework layer of the Google android platform. At this time, the native libraries 22-2 use open source software. The native libraries 22-2 may be modified and ported, if necessary, and then set in the native library layer module 22.

The porting layer module 23 connects the native library layer module 22 to the platform layer module 30, and provides a function of managing the hardware of the terminal through the platform layer module 23.

That is, the porting layer module 23 is a layer in which operating system-dependent codes are organized so as to be easily transplanted, and includes a variety of hardware management modules such as a file system, a memory allocation module, a network module, basic libraries (stdio, stdlib, math, etc), a timer, device control modules (display, media, input device, 3D, etc), and other utilities.

The porting layer module 23 is configured to access the corresponding hardware of the terminal device 100 through the above-described hardware management modules and manage and control the hardware.

For example, the porting layer module 23 includes Kernel (DLL, pthread, etc), System (file, memory, socket, stdio, stdlib, string, math, time), Device (framebuffer, media, input, 3D, etc), and Utils (log, debug, etc).

A first application manager 60 and a second application manager 70 provide a variety of management functions of downloading, automatically upgrading, and erasing a corresponding application.

Figure 3:
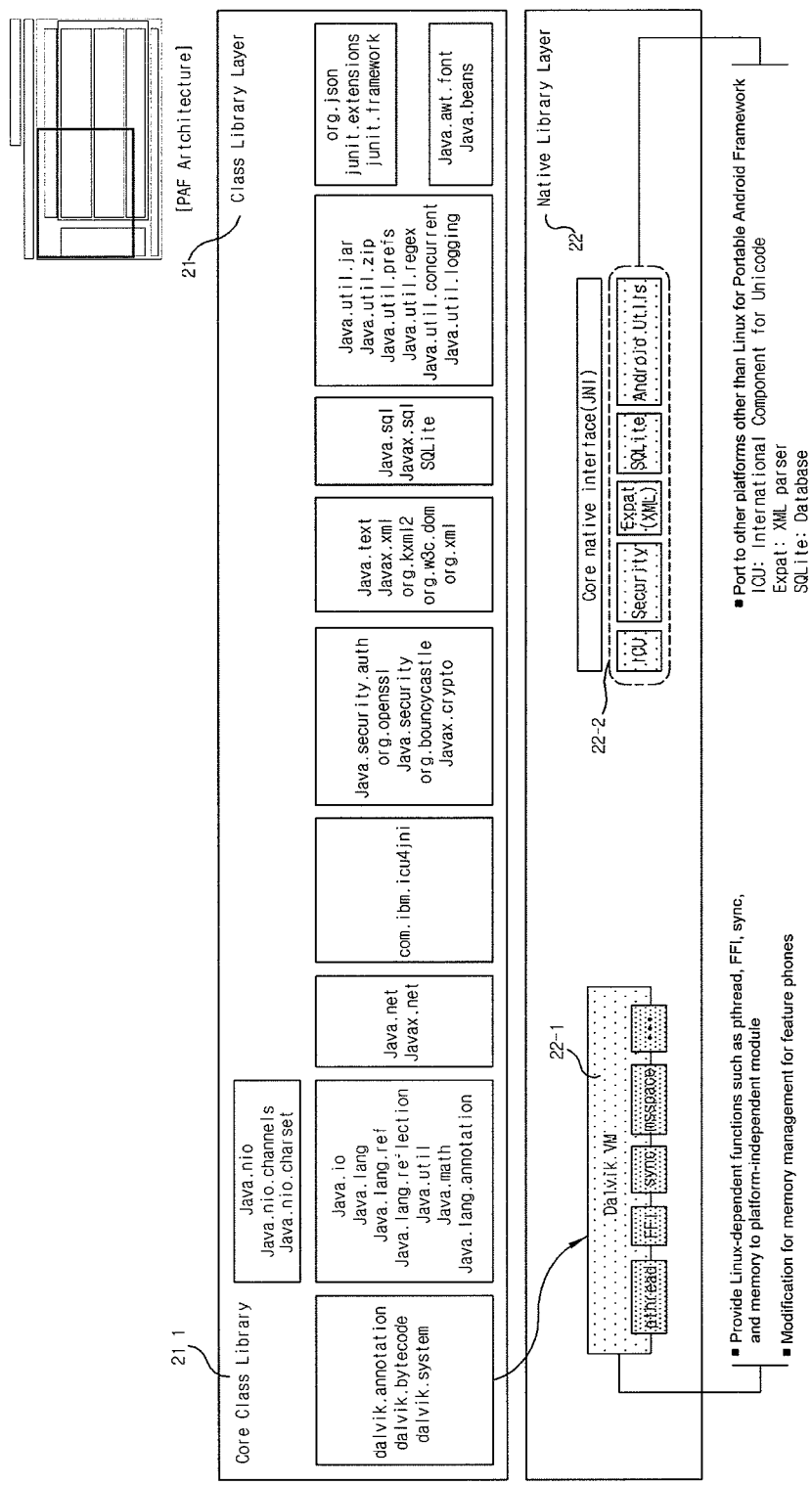
FIG. 3 is an expanded block diagram illustrating the left-side configuration of a class library layer module and a native library layer module of FIG. 2.

FIG. 3 is an expanded block diagram illustrating the left-side configuration of the class library layer module 21 and the native library layer module 22 of FIG. 2.

The VM 22-1 is applied by modifying the Dalvik VM. The Dalvik VM is a VM provided by the Google android platform, and is configured to have a slightly different concept from the Java VM. That is, the Dalvik VM may be operated in a smaller memory environment than the Java VM.

The VM 22-1 includes a thread management module, a dynamic management module, a foreign function interface (FFI), a synchronization module, a memory management module and so on. The thread management module is configured to manage threads such as pthread, and the dynamic management module is configured to manage dynamic libraries such as a shared object and DLL.

The above-described modules included in the VM 22-1 are platform-independent modules, and the VM 22-1 may operate while interworking with the platform layer module 30 through the porting layer module 23, without being affected by the platform. That is, the VM may escape from the Linux-dependent functions of the existing android platform.

Furthermore, the VM 22-1 is configured by modifying the existing Dalvik VM to perform the memory management according to the terminal device 100.

In addition, the VM 22-1 may be operated on a single task by modifying the existing Dalvik VM to operate the VM 22-1 even in the terminal device 100 which does not support multitasking but operates on a single task. That is, the VM 22-1 operates on a single task in interconnection with the platform layer module 30 through the porting layer module 23.

As described above, the core class library 21-1 provides a basic Java API for programming in Java.

The native libraries 22-2 serve as the foundation for implementing upper-layer libraries and may be ported and provided according to other platforms other than Linux.

Figure 4:
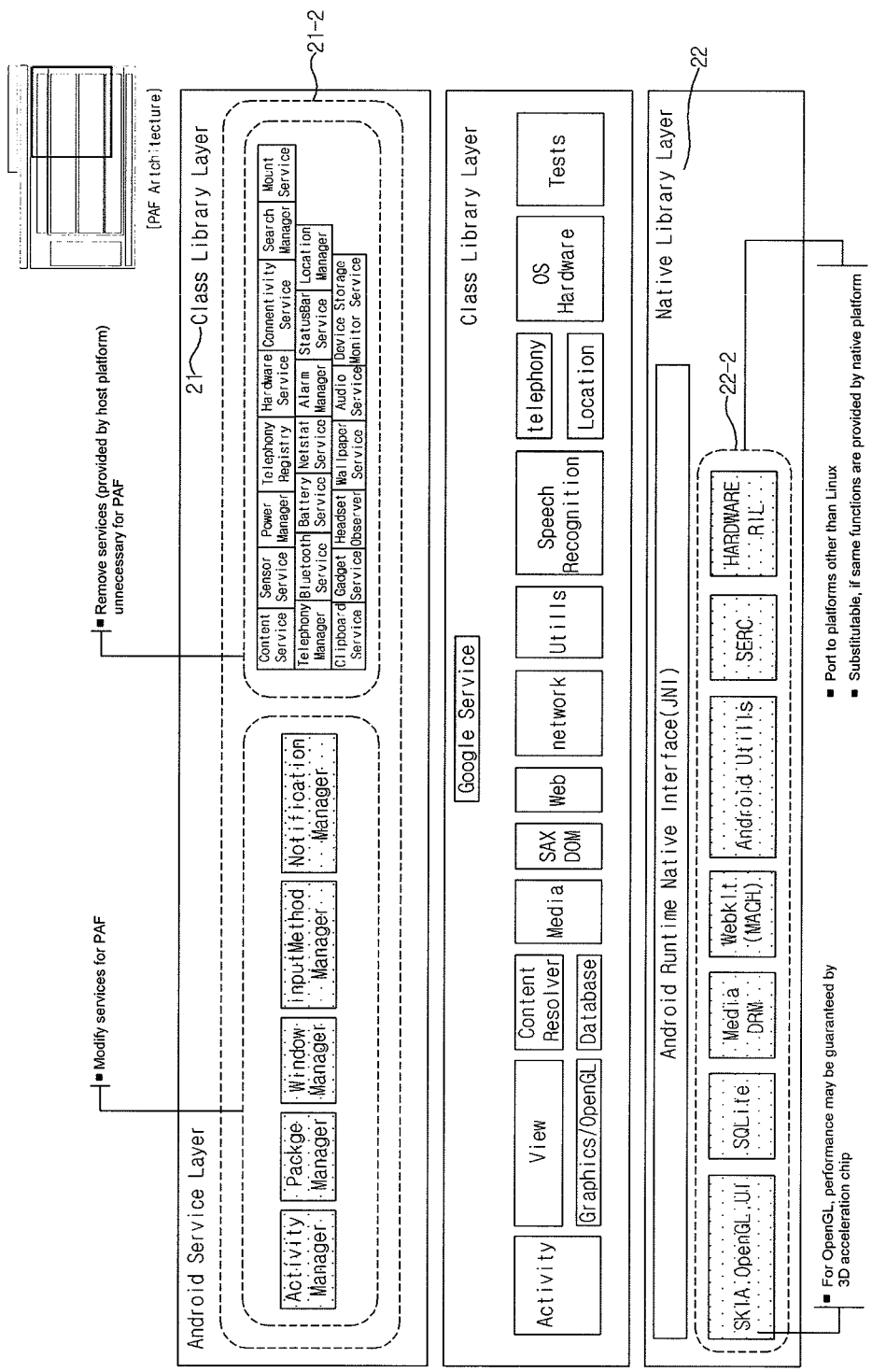
FIG. 4 is an expanded block diagram illustrating the right-side configuration of the class library layer module and the native library layer module of FIG. 2.

FIG. 4 is an expanded block diagram illustrating the right-side configuration of the class library layer module 21 and the native library layer module 22 of FIG. 2.

Referring to FIG. 4, the native library layer module 22 includes a variety of native libraries 22-2 which operate in interconnection with the hardware management modules of the porting layer module 23.

The application framework module 21-2 may includes a variety of service modules for performing telephone service, location-based service, Bluetooth networking service, WiFi networking service, USB service, sensor service and so on. At this time, the services provided by the service modules may serve as servers or daemons in the entire system. When the second application is executed, the corresponding service is executed in background.

The respective service modules may be modified, if necessary, and unnecessary service modules may be removed to reduce the weight.

According to the embodiments of the present invention, the Google android applications may be executed not only in terminals of the Google android platform, but also in terminals operated by other operating systems. Therefore, as the android applications are served through a larger number of terminals, it is possible to create a variety of added values.

Furthermore, since the volume of the android platform may be reduced, the android applications may be served through general low-end feature phones, not high-end smartphones.

While the present invention has been described with respect to the specific embodiments, it will be apparent to those skilled in the art that various changes and modifications may be made without departing from the spirit and scope of the invention as defined in the following claims.

What is claimed is:

1. A terminal device of a non-Android platform for executing Android applications, comprising:
    an application layer module having at least one Android application;
    a native platform layer module of the non-Android platform for operating hardware resources of the terminal device; and
    a middleware module for connecting the application layer module and the native platform layer module,
    wherein the middleware module comprises a class library layer module, a native library layer module, and a porting layer module,
    and wherein,
    the class library layer module comprises an application framework module including class libraries required for executing the Android application and a core class library module providing a Java API (Application Programming Interface),
    the porting layer module, configured to connect the native library layer module and the native platform layer module, includes hardware management modules including at least one of file system, memory allocation module, network module, basic libraries, timers, and device control module, wherein the hardware management module provides a Linux standard API for managing hardware of the terminal device using OS (Operating System) dependent codes,
    the native library layer module comprises VM (Virtual Machine) and a native library, wherein the VM utilizes the hardware through the Linux standard API provided by the porting layer module when executing the Android applications based on the class libraries and the Java API provided in the class library layer module, the VM is configured to execute the Android applications not through Linux but through the native platform layer module by using thread management module, dynamic library management module, foreign function interface, synchronization module, memory management module which are platform-independent modules included in the VM, and wherein the native library is used for implementing the class libraries of the application framework module.

2. The terminal device of claim 1,
    wherein the VM operates on a single task in interconnection with the native platform layer module through the porting layer module.

3. The terminal device of claim 1,
    wherein the native library layer module comprises one or more native libraries which operate in interconnection with the hardware management modules of the porting layer module.

4. The terminal device of claim 3,
    wherein the application framework module comprises one or more service modules for performing telephone service, location-based service, Bluetooth networking service, WiFi networking service, USB service, and sensor service, and executes a corresponding service in background according to execution of the Android application.

5. A non-transitory computer readable recording medium for storing program of executing Android applications on a non-Android platform, wherein the program comprising:
    an application layer module having at least one Android application;
    a native platform layer module of the non-Android platform for operating hardware resources of the terminal device; and
    a middleware module for connecting the application layer module and the native platform layer module,
    wherein the middleware module comprises a class library layer module, a native library layer module, and a porting layer module,
    and wherein,
    the class library layer module comprises an application framework module including class libraries required for executing the Android application and a core class library module providing a Java API (Application Programming Interface),
    the porting layer module, configured to connect the native library layer module and the native platform layer module, includes hardware management modules including at least one of file system, memory allocation module, network module, basic libraries, timers, and device control module, wherein the hardware management module provides a Linux standard API for managing hardware of the terminal device using OS (Operating System) dependent codes,
    the native library layer module comprises VM (Virtual Machine) and a native library, wherein the VM utilizes the hardware through the Linux standard API provided by the porting layer module when executing the Android applications based on the class libraries and the Java API provided in the class library layer module, the VM is configured to execute the Android applications not through Linux but through the native platform layer module by using thread management module, dynamic library management module, foreign function interface, synchronization module, memory management module which are platform-independent modules included in the VM, and wherein the native library is used for implementing the class libraries of the application framework module.

6. The computer readable recording medium of claim 5, wherein the VM operates on a single task in interconnection with the native platform layer module through the porting layer module.

7. The computer readable recording medium of claim 5, wherein the native library layer module comprises one or more native libraries which operate in interconnection with the hardware management modules of the porting layer module.

8. The computer readable recording medium of claim 7, wherein the application framework module comprises one or more service modules for performing telephone service, location-based service, Bluetooth networking service, WiFi networking service, USB service, and sensor service, and executes a corresponding service in background according to execution of the Android application.

* * * * *